United States Patent Office 3,324,198
Patented June 6, 1967

3,324,198
COMPOSITION COMPRISING THE REACTION PRODUCT OF A CARBOXY-TERMINATED POLYMER OF A CONJUGATED DIENE, A POLYEPOXIDE CONTAINING AT LEAST 3 EPOXY GROUPS, AND AN IMIDAZOLINE ACCELERATOR
Jerry T. Gruver, Bartlesville, Okla., assignor to Phillips Petroleum Company, a corporation of Delaware
No Drawing. Filed June 22, 1964, Ser. No. 377,063
14 Claims. (Cl. 260—836)

This invention relates to novel compositions and a method for their production. In one aspect the invention relates to a composition obtained by heating a mixture of a carboxy-terminated polymer of a conjugated diene, a polyepoxide compound and an imidazoline compound. In another aspect this invention relates to a method for the preparation of novel compositions, ranging from rubbers to hard plastics, which comprises commingling a liquid carboxy-terminated polymer of a conjugated diene with a polyepoxide compound and an imidazoline compound and heating the mixture thus obtained.

I have now discovered that by heating a commingled liquid carboxy-terminated polymer of a conjugated diene, a polyepoxide compound, as described herein, and an imidazoline compound, subsequently described, compositions are obtained which are useful as are rubbers, rigid plastics and compositions having properties partaking of rubbers and plastics which can be said to lie in a range defined by rubber on the one end and rigid plastics on the other end.

Carboxy-terminated polymers of conjugated dienes range from free flow-liquids to rubbery products. This invention is related to using the liquid polymers or products. These materials can be vulcanized using conventional rubber compounding recipes by which means vulcanizates are crosslinked through their points of unsaturation in a manner similar to that of curing with conventional rubbery polymers. When so operating, crosslinking occurs intermediate to the ends of the polymer chains, leaving an appreciable portion of the molecule not bound in the crosslinked network. The materials can also be treated with difunctional reagents such as glycols, dihaloalkanes, diepoxy compounds such as the epoxy resins and the like, by which means they are coupled to provide longer polymer chains having increased molecular weights, but a true cure is not realized. Heretofore the mass consisting essentially of the liquid carboxy-terminated polymer of a conjugated diene and a material containing at least three epoxy groups was subjected to curing by heating to provide a firm but resilient mass having desirable properties. We have now discovered a method and composition by which the curing rate is increased.

Accordingly, it is an object of the present invention to provide a novel polymer composition. It is another object of this invention to provide a method for producing a novel polymer composition. It is another object of this invention to produce a polymer composition ranging from rubber to hard plastic. It is another object of this invention to convert a liquid carboxy-terminated polymer of a conjugated diene into a material having properties exhibited by rubbers, hard plastics and products having properties intermediate rubbers and hard plastic. It is a still further object of the invention to provide a cross-linked polymer mass having the characteristic of being firm yet resilient. A further object is to provide a novel process for the accelerated curing of liquid carboxy-terminated polymers of a conjugated diene.

Other aspects, objects and the several advantages of this invention will be readily apparent from a study of the disclosure and the appended claims.

According to the present invention, a novel polymer product is produced by commingling or admixing a carboxy-terminated polymer of a conjugated diene with a polyepoxide compound containing at least three epoxide groups and an imidazoline compound and thereafter heating the resulting mixture so as to obtain accelerated cure thereof. The carboxy-terminated polymers used are liquid.

The particular liquid carboxy-terminated polydienes used in this invention can be prepared by any suitable means. One procedure for such synthesis involves solution polymerization of the diene in the presence of an alkali metal catalyst and treatment of the resulting polymer with carbon dioxide. The catalysts employed include the group consisting of an alkali metal, an alkali metal hydride, and an organo compound of an alkali metal. Presently preferred are lithium catalysts, still more preferred being dilithium organic compounds such as dilithiobutane, dilithium stilbene, dilithium naphthalene and the like. By employing the dilithium organic compounds the polymer molecules obtained are terminated at each end by a lithium atom. By treatment with carbon dioxide, these lithium atoms are replaced by carboxy groups, present as lithium salts. As the final step the product is treated with an acid in order to convert the lithium salt to the free acid form. The carboxy-terminated polymers of butadiene used in the invention are those materials which are liquid and which can be represented by the general formula $$HOOC[CH_2CH=CHCH_2]_nCOOH$$

in which $n$ is a number between 10 and 300.

Carboxy-terminated liquid copolymers of a conjugated diene with a vinyl monomer can also be used in this invention. Suitable vinyl monomers include styrene, methyl acrylate, methyl methacrylate, vinyl chloride, acrylonitrile, and the like, the amount of comonomer present usually being less than 50 parts, preferably less than 25 parts per hundred parts of monomer.

The polyepoxy compounds employed will contain at least three epoxy groups

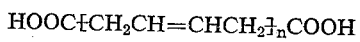

these groups being units in an open chain hydrocarbon chain or as branches therefrom. The percent oxygen will usually exceed 0.5 percent and will preferably be in the range from 2 to 12 percent or higher. Typical of such compounds are Triepoxyhexane,
Triepoxydecane,
2,3:6,7:11,12-triepoxydodecane,
2,3:5,6-diepoxy-9-epoxyethyldodecane,
Pentaepoxyeicosane,
2,3,5-triepoxyethyl-9,10-epoxyhexadecane,
4-(diglycidylamino)phenylglycidyl ether,
Liquid epoxidized polybutadiene with 3 or more epoxy groups per molecule, and the like.

As stated, the carboxy-terminated polymers used are liquid materials. The carboxy-terminated polymer can be mixed with the liquid epoxy compound and the imidazoline by simply stirring to provide a liquid blend which can be poured into a mold, spread in sheets, or incorporated as a component of a laminate or the like. Upon heating, the mass rapidly crosslinks to provide a firm but resilient mass having excellent properties.

Usually, when adding from 1 to 10 equivalents of the epoxy compound (based on equivalents of the epoxy groups present) per carboxy group equivalent present in the carboxy-terminated polymer, masses obtained according to the present invention can be cured to rubbery solids. By using larger amounts, generally from above 10 to 1000, preferably from 40 to 500 equivalents, of the epoxy compound per carboxy group equivalent, hard resins can be obtained. In the latter embodiment, it is necessary to include in the mixture a curing agent for the excess epoxy compound, such as maleic anhydride, phenlyenediamine, triethylenetetramine and the like. A small amount of a phenolic material such as phenol-resorcinol, or the like, is frequently desirable when using an amine in the system, and glycols are often added when using a maleic anhydride system. These secondary curatives are usually preferred when operating with from 50 to 100 or more equivalents of epoxy compound per equivalent of carboxy groups present in the polymer. Such systems are conventional for curing of epoxy resins. The amount of epoxy compound employed will generally be in the range between about 1 and 10 equivalents of epoxy compound per equivalent of carboxy group in the carboxy-terminated polymer.

The imidazolines employed as accelerators in the present invention are selected from those represented by the formulas

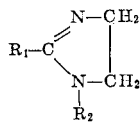

and

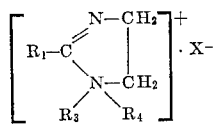

wherein $R_1$, $R_3$, and $R_4$ are straight chain alkyls or alkylene groups having 2 to 20 carbon atoms and $R_2$ is $-C_nH_{2n}OH$, wherein $n$ is an integer from 1 to 10, and X is a halogen.

Compounds representative of the imidazolines suitable for use in the present invention are 1-(2-hydroxyethyl)-2-heptadecenylimidazoline (Amine O), 1-(2-hydroxyethyl)-2-undecylimidazoline (Amine C), 1-(2-hydroxyethyl)-2-heptadecylimidazoline (Amine S), 1-hydroxymethyl-2-ethylimidazoline, 1-(10-hydroxydecyl)-2-eicosylimidazoline, 1,1-dialkyl-2-heptadecylimidazolinium chloride (Quaternary O) when the alkyl groups are, on the average, ethyl groups, 1-ethyl-1-undecenyl-2-octylimidazolinium bromide, 1-decyl-1-eicosyl-2-eicosenylimidasolinium iodide, and the like.

Acceleration of the polyepoxide curing of carboxy-terminated liquid polymers is effected by the presence of 0.1 to 5.0, preferably 0.5 to 2.5 php. (parts per 100 parts by weight of polymer) of the imidazolines.

The heating or curing step of the invention will generally be effected at a temperature in the range between 100 and 500° F., preferably from 200 to 400° F., for from 10 minutes to 100 hours, preferably from 0.5 to 50 hours. One skilled in the art in possession of this disclosure can readily determine by routine test the desirable conditions, which in a given case may be even outside the recited ranges, which will yield a product contemplated to be produced by the present invention.

Products from the process of the invention are useful in a variety of applications. Particularly significant is the finding of the applicability of the liquid mixtures of liquid carboxy-terminated polybutadienes with liquid epoxy compounds and the accelerators of by invention in plastisol-type molding operations. These liquid blends have a long pot life at ambient temperatures but can be set up to solid products by a relatively short heating period. They are thus applicable for use as potting compounds in the fabrication of electrical goods, the manufacture of toys, gaskets, household items, and the like. Molding can be readily effected without the need for expensive extrusion or injection molding equipment. The blends can be employed for the production of foamed articles by incorporation therein of chemical blowing agents. Articles fabricated from these materials have outstandingly good low-temperature properties, rendering them useful as gaskets in refrigeration systems, for goods employed in high-altitude flight and in arctic or subarctic regions.

The resinous materials prepared by blending a large proportion of epoxy compound with a small amount of liquid carboxy-terminated polymer and the accelerators of my invention are modified in hardness, thus improving their properties for numerous applications. Being generally thermosetting, they are useful in applications in heated environments when many thermoplastics cannot be used.

In any or all of the foregoing embodiments, pigment fillers, or other additives can be incorporated in the mixture prior to the heating step as may be desired for the particular use for which they are designed.

A better understanding of the invention can be obtained from the following example.

*Example*

Separate portions of a carboxy-terminated polybutadiene were mixed with 5 php. of a commercial polyepoxide ERL O500 [4-(diglycidylamino)-phenylglycidyl ether] and varying amounts of accelerators of this invention and cured 2 hours at 250° F. The cure obtained is indicated by the relative values for Shore hardness (ASTM D676–59T, type A Shore durometer):

| Run No. | Accelerator | Php.[c] | Shore Hardness |
|---|---|---|---|
| 1 | None | | [d] 0 |
| 2 | Imidazole [a] | 0.5 | 8 |
| 3 | ----do---- | 1.0 | 4 |
| 4 | Amine O [b] | 1.0 | 34 |
| 5 | Amine C [b] | 1.0 | 37 |
| 6 | ----do---- | 3.0 | 34 |
| 7 | Amine S [b] | 1.0 | 33 |
| 8 | ----do---- | 3.0 | 38 |
| 9 | Quaternary O [b] | 1.0 | 30 |
| 10 | ----do---- | 3.0 | 32 |

[a] 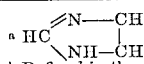
[b] Defined in the disclosure.
[c] Parts per 100 parts of polymer.
[d] Too soft to measure.

The above data clearly illustrates the accelerating effect obtained by the use of the imidazoline accelerators defined in the present invention and, in addition, shows that a compound related to those utilized in the present invention but not contemplated therein gives very poor cure.

Reasonable variations and modifications are possible within the scope of the foregoing disclosure and the appended claims to the invention, the essence of which is that liquid carboxy-terminated polymers of conjugated dienes, polyepoxide compounds containing at least three epoxy groups and certain imidazoline compounds, when mixed and heated, are found to produce compositions exhibiting useful characterisics.

I claim:
1. A process for the preparation of a novel composition which comprises admixing a liquid carboxy-terminated polymer of a conjugated diene and a polyepoxide compound containing at least three epoxy groups and an imidazoline selected from those of the formulas

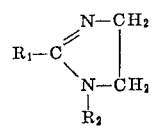

and

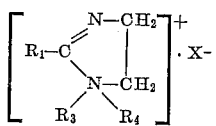

wherein $R_1$, $R_3$, and $R_4$ are straight chain alkyls or alkylene groups having 2 to 20 carbon atoms and $R_2$ is —$C_nH_{2n}OH$, wherein $n$ is an integer from 1 to 10, and X is a halogen.

2. A process according to claim 1 wherein said imidazoline is present in an amount in the range of 0.1 to 5.0 php.

3. A method of producing a composition which comprises mixing a liquid carboxy-terminated polymer of a conjugated diene, a liquid polyepoxide compound containing at least three epoxy groups, an epoxy curing agent, and an imidazoline of the formulas

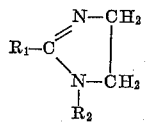

and

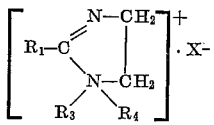

wherein $R_1$, $R_3$, and $R_4$ are straight chain alkyls or alkylene groups having 2 to 20 carbon atoms and $R_2$ is —$C_nH_{2n}OH$ wherein $n$ is an integer from 1 to 10, and X is a halogen, the polyepoxide compound being present in an amount of from about 10 to about 1000 equivalents per carboxy group equivalent.

4. A process according to claim 3 wherein said imidazoline is present in an amount in the range of 0.1 to 5.0 php.

5. The process of claim 1 wherein the admixture is heated to obtain accelerated cure.

6. The process of claim 1 wherein said polymer of a conjugated diene is a polymer of butadiene.

7. The composition formed by admixing a liquid carboxy-terminated polymer of a conjugated diene and a polyepoxide compound containing at least three epoxy groups and an imidazoline selected from those of the formulas

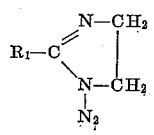

and

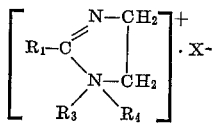

wherein $R_1$, $R_3$, and $R_4$ are straight chain alkyls or alkylene groups having 2 to 20 carbon atoms and $R_2$ is —$C_nH_{2n}OH$ wherein $n$ is an integer from 1 to 10, and X is a halogen and heating the admixture sufficiently to obtain a cure.

8. The composition of claim 7 wherein said polymer of a conjugated diene is a polymer of butadiene.

9. The composition of claim 7 wherein said polyepoxide compound is a liquid epoxidized polybutadiene.

10. The process of claim 3 wherein the mixture is heated to obtain an accelerated cure.

11. The process of claim 3 wherein said polymer of a conjugated diene is a polymer of butadiene.

12. The composition formed by admixing a liquid carboxy-terminated polymer of a conjugated diene, a liquid polyepoxide compound containing at least three epoxy groups, an epoxy curing agent, and an imidazoline of the formulas

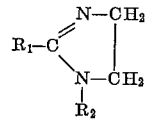

and

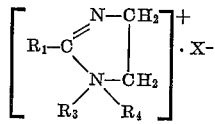

wherein $R_1$, $R_3$, and $R_4$ are straight chain alkyls or alkylene groups having 2 to 20 carbon atoms and $R_2$ is —$C_nH_{2n}OH$ wherein $n$ is an integer from 1 to 10, and X is a halogen, the polyepoxide compound being present in an amount of from about 10 to about 1000 equivalents per carboxy group equivalent.

13. The composition of claim 12 wherein said polymer of a conjugated diene is a polymer of butadiene.

14. The composition of claim 12 wherein said polyepoxide compound is a liquid epoxidized polybutadiene.

References Cited

UNITED STATES PATENTS 2,947,338   8/1960   Reid _____ 260—836

MURRAY TILLMAN, *Primary Examiner.*

PAUL LIEBERMAN, *Assistant Examiner.*